March 29, 1960 H. W. CHRISTENSON 2,930,257
TRANSMISSION

Filed Jan. 26, 1955 3 Sheets-Sheet 1

INVENTOR
Howard W. Christenson
BY
T. L. Chisholm
ATTORNEY

March 29, 1960     H. W. CHRISTENSON     2,930,257
TRANSMISSION

Filed Jan. 26, 1955     3 Sheets-Sheet 2

INVENTOR
Howard N. Christenson
BY
T. L. Chisholm
ATTORNEY

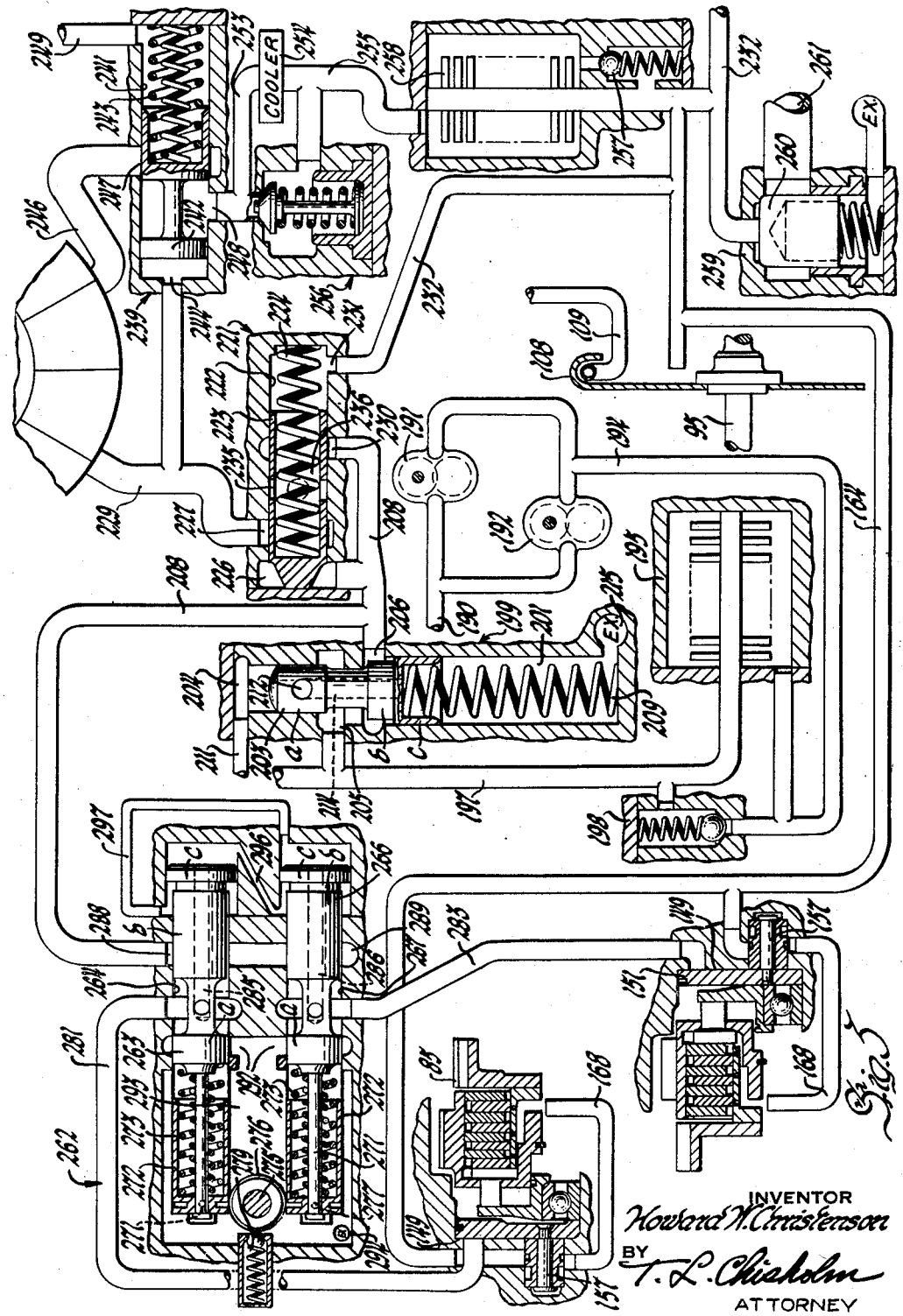

United States Patent Office 2,930,257
Patented Mar. 29, 1960

2,930,257

TRANSMISSION

Howard W. Christenson, Indianapolis, Ind., assignor to General Motors Corporation, Detroit, Mich., a corporation of Delaware Application January 26, 1955, Serial No. 484,122

15 Claims. (Cl. 74—720.5)

This invention relates to automatic transmissions and more particularly to transmissions having a controlled differential steering drive for road contacting driven members.

An object of the invention is to provide in a drive assembly having a multiple speed ratio transmission connected by a cross drive shaft to a double differential with interconnected torque reaction members, a power steer shaft driven by said transmission and connected to said double differential torque reaction members by a right and a left hand steering clutch and a flywheel connected to the torque reaction member of said double differential.

Another object of the invention is to provide in a cross drive transmission having a double differential torque reaction steering system controlled by right and left-hand steering clutches, a flywheel connected to the torque reaction member of the double differential.

Another object of the invention is to provide a transmission drive assembly having a steering clutch, a steering clutch cooling and lubricating system wherein the control valve provides a small flow of lubricating oil when the clutch is released and a large flow of cooling oil when the clutch is applied.

Another object of the invention is to provide a transmission having a control and steering system, a piston arranged to control the steer clutch and a spool valve attached to said piston and movable from a position admitting a small quantity of lubricating oil to the steering clutch when the clutch is released and a position admitting a large quantity of cooling oil to the steering clutch when the clutch is applied.

Another object of the invention is to provide an automatic transmission having a steering control arrangement, a pair of steering valves connected to the right and left hand steering clutches and arranged to be actuated by a single control lever, a hydraulic reaction force acting on the valves and arranged to oppose the movement of one valve and to assist the movement of the other valve of the steering system.

The engine is connected by means of either the torque converter or the direct drive lockup clutch to the three speed and reverse planetary gear transmission. The output shaft of the transmission is connected by a bevel gear set to the cross drive shaft. The cross drive shaft drives the ring gear of a planetary gear set located at each side of the vehicle. These two planetary gear sets provide the double differential drive and include pinions meshing with the ring gear and a sun gear. The pinions are mounted on a carrier connected to the intermediate output shaft which drives the propulsion members. The reaction of this double differential is provided through the sun gear in each differential gear set and a drive interconnection between the sun gears to provide the normal differential type drive. The torque converter or the direct drive clutch output shaft extends through the transmission and provides both a transmission input and a steer drive which is transmitted through a gear connection to the steer drive shaft. The steer drive shaft is connected via the right and the left steer clutches to the torque reaction sun gears of the differential on each side of the vehicle. The double differential drives an intermediate output shaft which has mounted thereon a multiple disc type brake and drives the sun gear of the planetary reduction gear. The pinions on the output are connected by the output shaft to the propulsion member driving the vehicle. The multiple plate steer clutch is located in the double differential housing and connects the sun gear of the double differential to the spur gear driven by the steer shaft. The clutch is actuated by a hydraulic servo motor having a stationary annular piston acting through a ball bearing transfer bearing. A spool valve, fixed to move with the annular piston, admits a very small quantity of oil to lubricate the steering clutch when the clutch is disengaged and admits a large quantity of lubricant to the steering clutch to cool the clutch plates when the clutch is engaged. The hydraulic control system for the transmission, the torque converter and the steering clutches, have a fluid supply composed of engine and output shaft driven pumps. A first pressure regulator valve supplies a low pressure for intermediate and high ratio control and a higher pressure for low and reverse ratio control. Thereafter a series of pressure regulator valves provides sequentially further reduced pressures for the steering clutch system, the torque converter and the lubricating system. The steering clutch control employs a pair of valves which are simultaneously moved in opposite directions by a single control lever to admit operating fluid to either steer clutch servo. The vehicle operator can feel the extent of pressure being applied to the steer clutch servo on the control handle for the steering valves since the steering valves are cross-connected so that the clutch apply pressure opposes the movement of one steering valve and assists the movement of the other steering valve.

These and other objects of the invention will be more apparent from the following description and drawing of a preferred embodiment of the invention.

Fig. 3 is a schematic view of the hydraulic control system for the converter and steering system.

Figure 1:
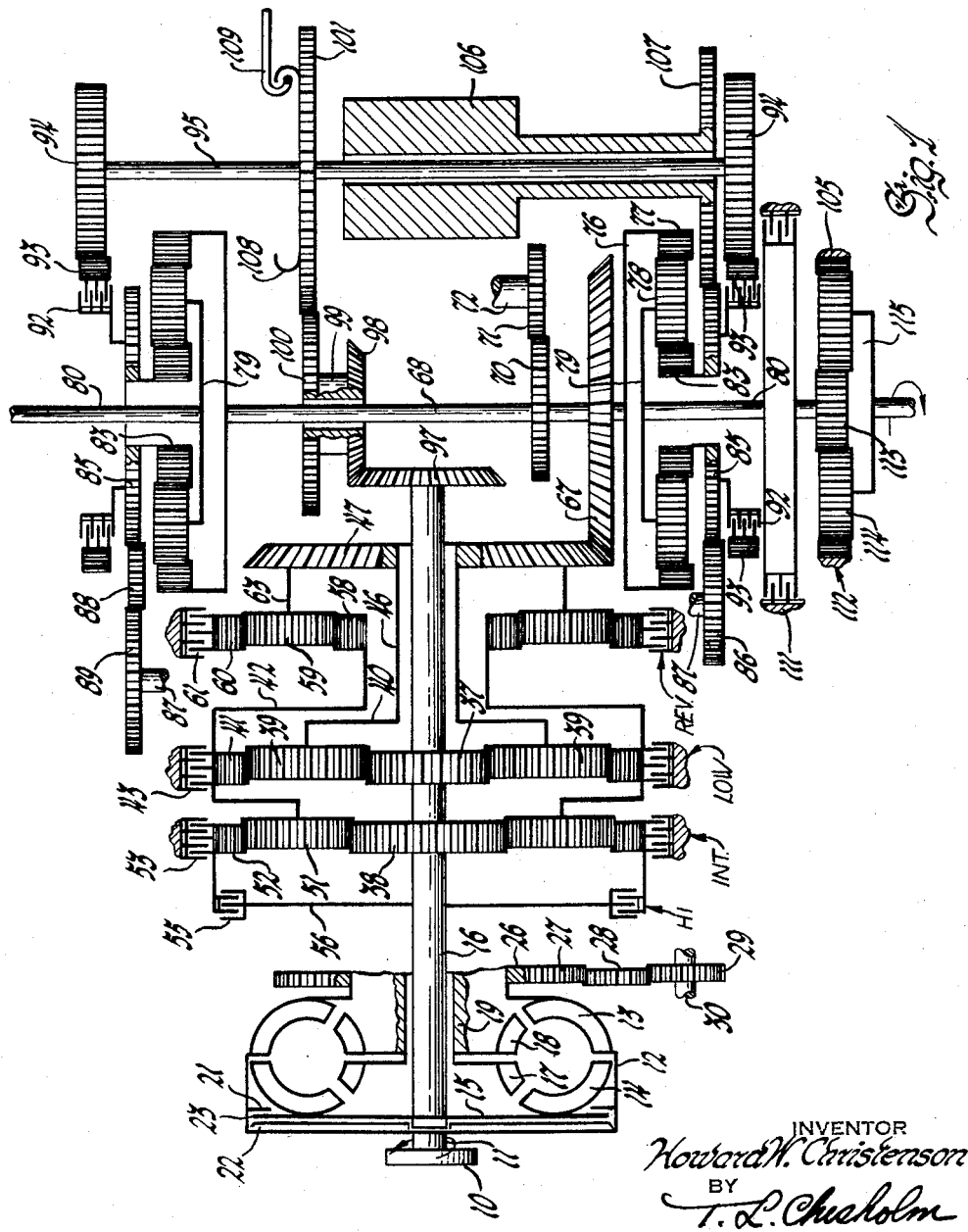
Fig. 1 is a diagrammatic view of the transmission including the torque converter, the planetary ratio gearing and the double differential steering drive.

Referring to the drawing, Fig. 1 shows a diagrammatic view of the transmission gearing. The engine drive shaft is connected to a coupling flange 10 on the converter input shaft 11 which drives the torque converter housing 12. The impeller blades 13 are mounted within the torque converter housing 12 and hydrokinetically drive the turbine 14 which is mounted on a drive disc 15 connected to the torque converter output shaft 16. The first stator 17 and the second stator 18 are connected in the usual way through one-way brakes to the sleeve portion of the housing 19. The fixed clutch driving disc 21 is mounted on the torque converter housing 12 and the movable annular plate 22, which serves as a clutch driving disc and as a piston, is mounted for axial sliding movement on the shaft 16. The clutch driven plate 23 is mounted on the drive disc 15 on output shaft 16. When fluid is admitted under pressure to the space between the front wall of the torque converter housing 12 and the annular plate 22, the plate 22 acts as a piston and moves until the clutch plate portion of the plate 22 engages the clutch driven plate 23 to provide a direct drive between the input shaft 11 and the torque converter output shaft 16. An accessory drive gear 26 is mounted at the rear of the torque converter housing 12 and drives, through spur gears 27, 28 and 29, an accessory drive shaft 30 for the engine driven pumps, a power take-off shaft or other accessory which it is desired to connect to the engine.

The torque converter output shaft 16 is directly connected to the input gears, a small sun gear 37 and the large sun gear 38, of the three ratio and reverse planetary transmission unit. The small or low ratio sun gear 37 meshes with the planetary pinion 39 mounted on the carrier 40 and the planetary pinion meshes with a ring gear 41 on a carrier element 42. Ground clutch or brake 43 is applied to stop the carrier element 42 and the ring gear 41 thereon in order to provide low speed drive through the carrier element 40, the sleeve shaft 46 and the output bevel gear 47. The large or intermediate ratio sun gear 38 meshes with the planetary pinion 51 mounted on the carrier 42. The planetary pinion 51 also meshes with the ring gear 52 which is controlled by the intermediate brake 53. The high speed clutch 55 has a driving element 56 connected to the torque converter output shaft 16 and a driven element connected to the ring gear 52. The reverse planetary gear unit has a sun gear 58 mounted on planetary carrier 42 which meshes with the planetary pinion 59 mounted on a carrier 63 attached to the output bevel gear 47. A ring gear 60 meshes with the planetary gear 59 and is controlled by the reverse brake 61.

This transmission provides three forward speed ratios and reverse by individually actuating one servo motor to engage one of the friction clutches or brakes at a time. When the low brake is engaged, the carrier 42 and the associated ring gear 41 is held stationary and the sun gear 37 drives the planet gear 39 which is connected to the output gear 47 at the reduced speed. In intermediate speed, the brake 53 is applied to stop the ring gear 52 and provide a double planetary intermediate gear. When the ring gear 52 is stationary, the sun gear 38 drives the planetary pinion 51 to rotate the ring gear 41 and the planetary carrier 42 at a reduced speed. Since the carrier 42 and its associated ring gear 41 is rotating, the drive from the sun gear 37 to the planetary pinion 39 is at a slightly increased speed, compared to the low ratio and the planetary pinion 39 is similarly connected by the carrier 40 and shaft 46 to the output bevel gear 47. High gear is provided by engaging the high clutch 55 to connect the input shaft 16 through the plate 56 to the ring gear 52. Since the ring gear 52 and the sun gear 38 of the intermediate planetary gear set are connected to the input shaft, this planetary gear set and the entire dual planetary gear set are locked and the carrier 40 and sleeve shaft 46 drive the output bevel gear 47 at 1 to 1 or direct drive. Reverse is obtained by engaging brake 61 to stop the ring gear 60. Then the planetary gear 59 connected by carrier 63 to the output gear 47 is driven by the sun gear 58 on the carrier element 42. The intermediate and low planetary gear sets drive the sun gear 58 to provide reverse drive. For a more complete description of this transmission and showing of a suitable control system, reference is made to the co-pending applications of Robert M. Tuck, Serial Number 289,115 filed May 21, 1952, which has matured into Patent No. 2,853,891, Serial Number 311,817 filed September 27, 1952 which has matured into Patent No. 2,884,806, and Serial Number 451,146 filed August 20, 1954 which has matured into Patent No. 2,899,846.

The transmission output bevel gear 47 drives the bevel driven gear 67 fixed on the cross drive shaft 68. A spur gear 70 mounted on the shaft 68 drives the spur gear 71 to connect it to the brake cooling pump and output pump drive shaft 72. The cross drive shaft 68 extends across the vehicle and is connected by the support 76 to the ring gear 77 of the double differential. The ring gear meshes with planetary pinions 78 mounted on a carrier 79 connected to the intermediate shaft 80. The planetary pinions 78 also mesh with a sun gear 83 which is connected by a short connecting sleeve to the large spur gear 85. The sun gears 83 are the torque reaction members of double differential planetary gear sets, one being located on each side of the vehicle. The sun gears 83 are interconnected by the spur gears 85 and a torque reaction drive. The torque reaction drive consists of a spur gear 86 which meshes with the left hand gear 85 and is mounted on the torque reaction shaft 87. The right hand sun gear 83 is connected to the right hand spur gear 85 which meshes with the idler gear 88 and a spur gear 89 fixed on the torque reaction shaft 87. The torque reaction shaft shown broken away in Fig. 1 extends across the transmission above or below the drive gearing.

The steer clutch 92 has reactor plates connected through the gear 85 to the reaction sun gear 83 and driving plates attached to the ring gear 93. The right and left hand steer clutches 92 each have a ring gear 93 which meshes with a spur gear 94. Both the right and left hand spur gears 94, which drive the respective steer clutches, are fixed to the steer drive shaft 95. The steer drive shaft receives power from the torque converter output shaft through the connecting bevel gear 97 which drives the bevel gear 98 of cluster 99. Cluster 99 also has the spur gear 100 which meshes with spur gear 101 on the steer shaft 95. The flywheel 106 is rotatably supported on the steer shaft 95 and connected through gear 107 to the reaction spur gear 85.

A Pitot tube governor can 108 of annular shape is mounted on the spur gear 101 which drives the steer shaft 95 and thus is driven in accordance with the output speed of the torque converter. The Pitot tube 109 has its opened end positioned in the can facing the fluid rotating in the annular trough.

The intermediate output shaft 80 at each side of the vehicle is connected to the final drive assembly which includes a vehicle brake 111 and a planetary reduction gear 112. The shaft 80 drives the sun gear 113 which drives the pinions 114 and carrier 115 connected to the propulsion mechanism at reduced speed. The ring gear 105 of the planetary gear set is fixed to the housing 117.

Figure 2:
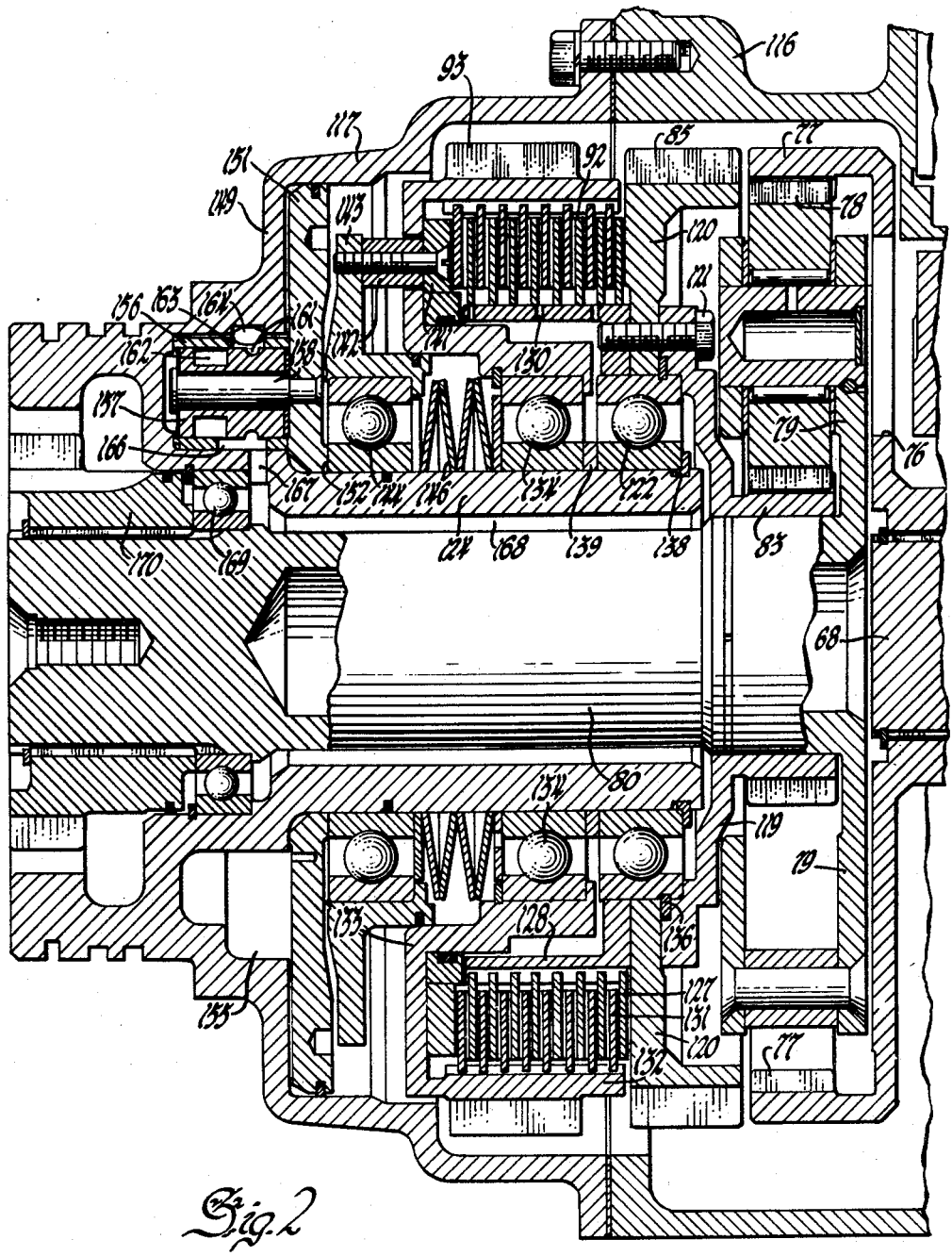
Fig. 2 is a sectional view of the differential and steering clutch with parts broken away and in section to show details.

Fig. 2 shows in detail the left hand planetary gear set of the double differential and the left hand steer clutch and servomotor which is located at the left side of the transmission housing 116 within the left steer clutch housing 117. The cross drive shaft 68 is suitably supported on the bearings in the transmission housing and has splined at its outer end the support 76 for the ring gear 77. The ring gear 77 meshes with planet pinions 78 and which mesh with reaction sun gear 83. The planet pinions 78 are rotatably supported on the carrier 79 fixed on the inner end of the intermediate shaft 80. The reaction sun gear 83 is rotatably supported by a disc 119 and the spur gear 85 is rotatably supported by a disc 120. The discs 119 and 120 are secured together by bolts 121 and rotatably supported on the thrust bearing 122 on an inner cylindrical sleeve portion 124 of the housing 117. The reaction plates 127 of clutch 92 are secured by suitable splines to a driven drum 128 which is also attached by the bolts 121 to the disc 119 and sun gear 83 and the disc 120 and spur gear 85 and rotatably supported on the bearing 122. The driving discs 131 of clutch 92 are suitably splined to the outer drum 132 which has a support 133 extending radially inwardly and within the clutch drum 128 to rotatably support the drum 132 on bearing 134 on housing sleeve 124. The outer race of thrust bearing 134 is secured to support 133 by a shoulder and snap ring to axially locate the support. The clutch drum 132 has formed on its outer surface the spur gear 93 which is connected by a spur gear 94 to the steer shaft 95. The sun gear support disc 119 and the spur gear support disc 120 and the clutch driven element 128 which is secured together by the bolt 121 are secured to the bearing 122 by a split ring 136 fitting between the two discs and into a groove in the outer race of the bearing 122. Split ring 136 in the outer surface of fixed sleeve 124 prevents movement bearings 122 to the right. A spacer ring 139 is located between bearings 122 and 134 so that the thrust on bearings 134 and 122 is transferred to the snap ring 138 and housing sleeve 124. An annular clutch pressure plate 141 is supported for axial movement within the drum support 133. A plurality of posts 142 are fixed to the pressure plate 141 by suitable screws and extend through apertures in the support 133 to prevent relative rotation of the pressure plate and outer drum. The posts 142 are secured to the transfer ring 143 which is suitably secured by shoulders to the outer race of thrust bearing 144. A retraction spring 146 consisting of a plurality of Belleville springs is located between the transfer bearing 144 and the fixed bearing 134. The left end of the casing 117 is formed to provide a cylinder 149 in which the piston 151 axially reciprocates. The front face of piston 151 has an annular foot 152 engaging the inner race of bearing 144 to transmit the actuating force through the transfer ring 143 to the clutch pressure plate 141. The cylinder 149 has an annular recess 155 located in the annular end wall of the cylinder. A valve sleeve 156 is fixed in an enlarged portion of the annular recess 155 and extends in an axial direction with respect to the piston. A hollow valve spool 157 which fits in the valve sleeve 156 is mounted on a stud 158 suitably riveted to the piston 151. The stud 158 extends axially from the rear face of the piston 151, through the central bore in the spool valve 157 and is headed to secure the spool valve in an axially fixed position with respect to the piston. There is sufficient clearance between the stud 158 and the bore in the spool valve 157 to permit sufficient flow of oil to prevent oil being trapped in the inner end of the valve sleeve 156. The valve spool 157 has an annular recess 161 having a very small cross section area located adjacent the piston and an annular recess 162 of a substantially larger cross sectional area located adjacent the free end of the spool. The valve sleeve 156 has a cooling oil inlet aperture or port 163 which receives fluid from the cooling oil passage 164. At diametrically opposite sides of the valve, the valve sleeve 156 has an outlet aperture or port 166 which is connected by an outlet passage 167 to the passage 168 between the housing sleeve 124 and the intermediate shaft 80. When the piston is in its fully retracted position, as shown, the small area annular passage 161 in the spool valve is aligned with the inlet port 164 and the outlet port 166. The outlet port is also made sufficiently large so that it will drain the large annular passage 162. Oil supplied by passage 167 will pass through the bearing 169 but is stopped by the sealing member 170. The oil will flow to the right through the space 168 between the housing sleeve 124 and intermediate shaft 80 through the bearing 122 and radially outwardly to the apertures 130 to the drum 128.

The fluid or oil for the control and cooling systems shown in Fig. 3 is supplied from the transmission sump 190 by a pump 191 driven by the output shaft and pump 192 driven by the input shaft. The pumps are arranged in parallel and deliver the oil through a common supply passage 194 to an oil filter 195 which discharges the filtered oil to a transmission control passage 197. A by-pass valve 198 is provided between the filter supply passage 194 and the transmission control passage 197 to by-pass the oil around the filter when the filter is clogged. The transmission control system which is supplied with fluid under pressure by the passage 197 may be a manual system as illustrated in application Serial Number 289,115 filed by Robert M. Tuck on May 21, 1952 or an automatic system as illustrated in his application Serial Number 311,817 filed September 27, 1952. As in these systems, the transmission control pressure in passage 197 is regulated by a regulator valve 199 which is located in a bore 201 located in a valve body or housing portion. The transmission control pressure regulating valve 203 has a small diameter land $a$ at one end, a central land of intermediate diameter spaced from land $a$ by a portion of reduced diameter and a large diameter land adjacent land $b$. The small land $a$ fits in the small diameter portion of bore 201 between the control port 204 at the end and the inlet port 205 connected to the transmission control passage 197. The land $b$ has a diameter smaller than the large diameter bore portion of the bore 201 located below the port 205. The fluid outlet port 206 is connected to the steer clutch supply passage 208. Valve 203 has a third land $c$ fitting the bore 201 to close port 206. The spring 209 is positioned in the bore and resiliently urges the valve 203 upwardly against the fluid pressure in passage 211 which is connected to port 204 to supply a pressure to the top face of valve 203 when the transmission is in intermediate and direct drive to reduce the pressure in passage 197. The aperture 212 in land $a$ of valve 203 is connected by an axial bore 214 extending through the valve 203 to provide an exhaust connected to the exhaust port 215.

The steer clutch regulator valve 221 has a valve element 223 located in and urged toward one end of a bore 222 in the valve housing by the spring 224. The port 226 at one end is connected to the steer passage 208. A second port 227 is connected to the converter supply passage 229 and a third port 230 is connected to the steer clutch passage 208. The fourth port 231 at the spring abutment end of the bore 222 is connected to a lubrication passage 232. The valve member 223 has a port 235 located intermediate the ports 227 and 230 in the bore 222 when the valve is in a closed position and providing a connection through a central passage 236 in the valve 223 to the lubrication passage 232.

The converter pressure regulator valve 239 has a valve member 242 slidably located in a bore 241 in the valve housing. The valve member 242 which has a pair of spaced lands is urged by springs 243 toward the end port 244 connected to the converter input passage 229. The converter output passage 246 is connected to port 247 which is closed when the valve is closed and connected between the lands to the outlet port 248 located between the inlet port 247 and the control port 244 when the valve is open. An exhaust port 249 permits oil which leaks past the piston to exhaust to the sump.

The outlet port 248 of valve 239 is connected by passage 253 through a cooler 254 to the cooler outlet passage 255. A by-pass valve 256 is located between the cooler input passage 253 and cooler output passage 255. Cooler output passage 255 delivers the oil to a filter 258 having a built-in by-pass valve 257 and an outlet connected to the lubrication passage 232. A pressure in the lubricating passage 232 and the connected steer clutch cooling line 164 is maintained by a relief valve 259 having a piston 260 which relieves excess pressure to a sump passage 261. The lubricating line 232 also supplies oil to the Pitot tube governor can 108 mounted for rotation on the steer shaft 95. Pitot tube 109 supplies the governor oil pressure proportional to the converter turbine 14 speed to the automatic control mechanism.

The steer clutch control valve 262 consists of a valve 263 located in a bore 264 for the left hand steer clutch and a valve 266 located in a bore 267 for the right hand steer clutch. A headed control rod 271 is secured to one end of the valve 263. The rod 271 has slidably mounted thereon a control member 272 having an annular recess and a sleeve guide for the springs 273 which hold the control member 272 against the head of the rod 271. The valve 266 has the same type of control rod 271, control member 272 and springs 273.

The steering control is actuated by a handle (not shown) located outside of the valve housing which rotates the shaft 275 to rotate lever 276. A pin 277 shown as a circle of dotted lines, Fig. 3, is secured to each end of lever 276 and extends radially into the annular groove at the end of each of the control members 272. A construction of this type is explained in Patent 2,689,488 issued to John E. Storer, Jr., and William G. Livezey on September 21, 1954. A spring loaded detent 279 engages a recess in the collar on the shaft 275 to hold the valves in the neutral or straight forward drive position. When valve 263 is in the neutral position, as shown in Fig. 3, the space betwen the lands 263a and b is connected to the line 281 to the left hand steer clutch cylinder 149. Similarly the space between the lands a and b of the valve 266 is connected by a line 283 to the cylinder 149 of the right hand steer clutch. Valve 263 also has a bore 285 extending from a space between the lands a and b to the other end of the valve beyond the land c. Land c has a larger diameter and is located in a larger diameter portion of the bore 264. Similarly valve 266 has a bore 286 connecting the space between the lands a and b to the end of the valve beyond the land c which is of larger diameter and fits into a larger diameter portion of the bore 267. The steer clutch supply line 208 is connected to the valve bore 264 at port 288 and to bore 267 at port 289. On the other side of the steer clutch lines 281 and 283, the common exhaust port 292 is located in bores 264 and 267. The exhaust port 292 discharges the exhaust through the chamber 293 housing the valve control shaft 275 and associated mechanism to exhaust 294. The chamber at the outer end of the land 263c is connected by a passage 296 to the chamber in the large portion of port 267 on the valve side of the land 266c to provide a reaction or feel for the steering handle. Similarly the chamber on the valve side of the passage 263c is connected by a line 297 to the chamber at the outside face of the land 266c.

The torque converter provides a multiple ratio drive between the engine and the converter output shaft 16. The converter output shaft is connected by the multiple ratio transmission providing three forward speed ratios and reverse to the transmission output bevel gear 47 which drives through the bevel gear 67 the transmission cross drive shaft 68. Cross drive shaft 68 is connected at each side of the vehicle to a ring gear 77 of a planetary gear set consisting of planetary pinions 78 and a carrier 79 mounted on the intermediate output shaft 80 and a torque reaction sun gear 83. The sun gears 83 of the planetary gear set on each side of the vehicle are held to provide the torque reaction by a spur gear drive consisting of the gears 85 and 86 on one side and gears 85, 88 and 89 on the other side of the vehicle with the final spur gears of the gear train on each side of the vehicle, that is, gears 86 and 89, interconnected by a transversely extending torque reaction shaft 87. This double differential drive arrangement provides both a reduction gear and a differential which is particularly adapted to be controlled for steering the vehicle. When the vehicle is moving in a straight line, the sun gears 83 of both the right and the left planetary gear set of the double differential are stationary. During a turn, the sun gear in the drive for the inside propulsion member will rotate backward to retard the inside propulsion member or track and the sun gear in the drive for the outside propulsion member will rotate forward to advance the outside propulsion member so that it can traverse the longer arc in the same time as the inside member traverses the shorter arc.

The spur gears 85 on each side of the vehicle which rotate with the torque reaction sun gears ar each connected by a steering clutch 92 to a live steering shaft which is driven through bevel gears 97 and 98 and spur gears 100 and 101 by the torque converter output shaft 16. The steer shaft 95 rotates in the proper direction so that when it is connected through gear 94 and the steer clutch 92 that it will rotate the sun gear backward and retard the associated propulsion member. Thus if the left hand clutch is applied so that the steer shaft 95 transmits power to reversely rotate the reaction sun gear 83 and retard the track on the left side of the vehicle, the torque reaction shaft 87 and gearing will forwardly rotate the reaction sun gear 83 and advance the track on the right side of the vehicle and the vehicle will turn to the left. A right turn is made when the right steer clutch is applied to reversely rotate the reaction sun gear 83 and retard the track on the right side of the vehicle and the cross shaft 87 will forwardly rotate the sun gear 83 and advance the track on the left side of the vehicle. In order to reduce vibration and clutch chatter in the steering assembly, a flywheel 106 is mounted to rotate about the live steer shaft 95 and is geared to rotate with the reaction sun gears 83 in order to increase the inertia of the double differential drive.

In the hydraulic control system illustrated in Fig. 3, the oil is supplied from the transmission sump 190 to output shaft driven pump 191 and input shaft driven pump 192 arranged in parallel to supply pressure to the passage 194. The oil then passes through a suitable filter 195 which has a check valve 196 in by-passing relation connected to the filter output passage 197. The passage 197 supplies fluid to the hydraulic gear ratio controls which, as indicated above, may be the same as disclosed in the co-pending applications of Robert M. Tuck, SN 289,115 or SN 311,817. The pressure regulator valve 199 is connected to the passage 197 which operates on the unbalanced lands a and c to move the valve and discharge fluid to port 206 into the steer clutch supply line 208. Further movement of valve member 203 will connect the transmission control supply passage 197, via port 205, through the port 212 in land a and bore 214 to the exhaust port 215 to provide a more rapid release of fluid to reduce the pressure. It will be noted that the line 211 supplies a pressure in the intermediate and high ranges of the automatic transmission to the space above the land a of valve 203 to reduce the pressure supplied to the transmission control mechanism in intermediate and high. This provides a high transmission control pressure in reverse and low ratios and a low pressure in intermediate and high ratios. Steer clutch pressure, which may be about 100 pounds per square inch, enters port 226 and acts on the end of the steer clutch pressure regulator valve 221. If the pressure of steer clutch line 208 is excessive or above 100 p.s.i., it will move the valve 223 to the right, compressing spring 224, and permit the fluid to enter port 227 and be supplied to the converter via passage 229. If the flow of fluid to the converter does not sufficiently reduce the pressure, further movement of the valve permits flow from passage 208 through the port 235 and the central bore of the valve 223 to the lubricating line 232.

The converter pressure is regulated by the converter pressure regulator valve 239. The end face of valve 242 of the converter pressure regulator valve 239 is acted upon by the converter input pressure 229 and tends to move the valve 242 to the right to permit flow of fluid from the converter exhaust passage 246 to the outlet port 248 and cooler supply passage 253. The cooler supply passage 253 is connected via cooler 254 to the cooler outlet passage 255. Check valve 256 permits the cooler to be by-passed if an excessive pressure is generated in the cooler. The cooler output line 255 is connected to a filter 256 having a by-pass valve 257 which discharges the fluid into the lubrication and cooling line 232. The pressure level in lubrication line 232 is maintained by a relief valve 259 which relieves excess pressure by opening the line to the sump.

The steering valves 262 are controlled by means of a manually operated shaft 275 extending into shaft 293 which is connected by means of a lever 276 having a pin and slot connection to the control member 272. The control member 272 is resiliently secured by spring 273 to the free headed end of the rod 271 secured to the end of valve 263 which controls the left hand steer clutch. The other end of the lever 276 actuated by the hand control has a similar pin and slot connection to a similar control member 272 which is mounted on a rod 271 and held at one end of the rod by a spring 273. The rod 271 is secured to one end of the valve 266 which controls the left hand steer clutch. With the valves in the straightforward position as shown in Fig. 3, the incoming fluid from the steer clutch supply line 208 is blocked at the ports 288 and 289. In order to make a left turn, the hand control shaft 275 is rotated to open left clutch valve 263 by moving it to the right in Fig. 3 away from the hand control shaft. When the valve 263 moves to open position the space between the lands 263a and b connects the supply passage 208 to the left hand steer clutch control passage 281 while maintaining the exhaust port 292 closed. The oil under pressure flowing between the lands 263a and b to the steer clutch also enters the bore 285 in valve 263 and flows to the chamber in the large end of bore 264 and acts on the end face of land 263c to oppose the movement of the valve. Since the hand control shaft acts on the valve through springs 273 and the steer clutch pressure opposes movement of the valve 263, the valve regulates the pressure of the fluid supplied to the steer clutch in accordance with the hand control shaft position and the movement of the hand control shaft is opposed by a force proportional to the pressure in the steer clutch passage 281. This force is called feel.

When the left clutch valve 263 is moved in to the apply position, the left clutch valve 266 is moved out to the exhaust position and connects the right clutch servo to exhaust port 292. The left clutch apply pressure in the end chamber of bore 264 acting on the end face of land 263c also is connected by passage 296 to act on the annular face of land 266c or the unbalanced area between land 266b and c to increase the feel force. Since the force on the unbalanced area of lands 266b and c is transmitted directly by the rod 271 to the hand control shaft 275, the valve 266 controlling the exhaust does not regulate the pressure. The right clutch pressure from passage 283 can act on the end face of land 266c and if it is excessive move the valve to open or to increase the opening of the exhaust port 292. Thus springs 273 limit the clutch apply pressure.

A right turn is made by moving the valves in a direction opposite to the above described movement for a left turn. For a right turn, the valve 266 is moved in the bore 267 to connect the pressure supply passage 208 to the right clutch supply passage 283 and to the bore 286 in valve 266 to the chamber at the end of valve bore 267 to act on the end face of land 266c. The pressure fluid acting on the end face of land 266c opposes the valve apply force of hand control shaft 275 which is transmitted through springs 273 and thus regulates the pressure in right clutch apply passage 283 and provides a feel force acting on the handle. This pressure force is also connected by passage 297 to the unbalanced area between lands 263b and c to add an additional feel force acting on shaft 275.

The right clutch apply passage 283 and the left clutch apply passage 281 are connected to the cylinders 149 of the servo motor actuating the respective steer clutches 127—131. The steer clutch cooling passage 164 is connected to the lubricating passage 232 and supplies oil to the spool valve 157. The spool valve 157 for each clutch transmits a small quantity of oil when the piston 151 is retracted to disengage the clutch and transmits a large quantity of oil when the piston 151 is advanced to engage the clutch. The fixed piston 151 and valve 157 move together and actuate the clutch pressure plate 141 through a thrust bearing 144 and a transfer ring 143.

It will be understood that the above description of a preferred embodiment of the invention is illustrative of the invention and that modifications may be made within the scope of the appended claims.

I claim:

1. In a transmission assembly, an input shaft, an output shaft, a multiple ratio drive unit connecting said input shaft and said output shaft, a cross drive shaft driven by said output shaft, a pair of planetary gear sets including a ring gear element, a sun gear element, and a carrier element having a set of planetary pinions meshing with said ring and sun gear elements, said cross drive shaft being drivingly connected at each end to one of said elements, a propulsion shaft at each side of the vehicle connected to another of said elements, a positive torque reaction drive interconnecting the third element of each planetary gear set for rotation in opposite directions, a steer shaft, said input shaft being connected to drive said steer shaft, a pair of steer clutches, said steer shaft and said third element of each of said planetary gear sets being connected by one of said steer clutches, means to operate alternatively either of said steer clutches to cause in conjunction with said positive torque reaction drive one of said third elements to rotate in one direction and the other of said third elements to rotate in the other direction to cause one propulsion shaft to rotate faster and the other propulsion shaft to rotate slower, and a flywheel mounted to rotate about the axis of said steer shaft and gear means interconnecting said flywheel to drive said flywheel at a speed constanly proportional to the speed of one of said third elements to reduce steering clutch vibration and chatter.

2. In a transmission assembly, an input shaft, an output shaft, a multiple ratio drive unit connecting said input shaft and said output shaft, a cross drive shaft driven by said output shaft, a pair of planetary gear sets including a ring gear, a sun gear, and a set of planetary pinions on a carrier meshing with said ring and sun gears, said cross drive shaft being drivingly connected at each end to one of said ring gears, a propulsion shaft at each side of the vehicle connected to one of said carriers, a torque reaction drive interconnecting said sun gears of each planetary gear set for rotation in opposite directions, a steer shaft, said input shaft being connected to drive said steer shaft, a pair of steer clutches, said steer shaft and said sun gear of each of said planetary gear sets being connected by one of said steer clutches, means to operate alternatively either of said steer clutches to cause in conjunction with said positive torque reaction drive one reaction sun gear to rotate forwardly and the other sun gear to rotate reversely to cause one propulsion shaft to rotate faster and the other propulsion shaft to rotate slower, and a flywheel driven by one of said sun gears to rotate at a speed constantly proportional to the speed of one of said sun gears to reduce steering clutch vibration and chatter.

3. In a transmission assembly, an input shaft, a first output shaft, a variable ratio drive unit connecting said input shaft and said first output shaft, an output shaft, a second multiple ratio drive unit connecting said first output shaft and said second output shaft, a cross drive shaft driven by said second output shaft, a pair of planetary gear sets including a ring gear, a sun gear, and a set of planetary pinions on a carrier meshing with said ring and sun gears, said cross drive shaft being drivingly connected at each end to one of said ring gears, a propulsion shaft at each side of the vehicle connected to one of said carriers, a positive torque reaction drive consisting of gearing and a cross torque reaction shaft interconnecting said sun gears of each planetary gear set for rotation in opposite directions, a steer shaft, said variable ratio transmission unit being connected to drive said steer shaft at a plurality of ratios, a pair of steering clutches, said steer shaft and said sun gear of each of said planetary gear sets being connected by one of said steer clutches, means to operate alternatively either of said steer clutches to cause in conjunction with said positive torque reaction drive one reaction sun gear to rotate forwardly and the other sun gear to rotate reversely to cause one propulsion shaft to rotate faster and the other propulsion shaft to rotate slower, and a flywheel driven by one of said torque reaction sun gears at a speed proportional to one of said torque reaction sun gears to reduce steering clutch vibration and chatter.

4. In a transmission assembly, an input shaft, an output shaft, a variable ratio drive unit connecting said input shaft and said output shaft, a cross drive shaft driven by said output shaft, a pair of planetary gear sets including a ring gear element, a sun gear element, and a carrier element having a set of planetary pinions meshing with said ring and sun gear elements, said cross drive shaft being drivingly connected at each end to one of said elements, a propulsion shaft at each side of the vehicle connected to another of said elements, a positive torque reaction drive interconnecting said third elements of each planetary gear set for rotation in opposite directions, a steer shaft, said variable ratio transmission unit being connected to drive said steer shaft, a pair of fluid controlled steering clutches, said steer shaft and said third element of each of said planetary gear sets being connected by one of said steer clutches, means including a hand controlled valve for each steering clutch to supply fluid under pressure to alternatively apply either of said steer clutches to cause in conjunction with said positive torque reaction drive one of said third elements to rotate forwardly and the other of said third elements to rotate reversely to cause one propulsion shaft to rotate faster and the other propulsion shaft to rotate slower to alternatively release the clutch that is not applied, means employing the fluid under pressure to apply one clutch to oppose the movement of the hand controlled valve supplying the fluid to apply one of said clutches and to oppose the movement of the other hand controlled valve exhausting the fluid to release the other clutch, and a flywheel mounted to rotate about the axis of said steer shaft and gear means connecting one of said third elements to drive said flywheel at a speed proportional to said one of said third elements to reduce vibration and chatter.

5. In a steering drive assembly, a drive shaft, a ring gear driven by said drive shaft, a plurality of planetary pinions meshing with said ring gear, a carrier, said planetary pinions being mounted on the carrier, a propulsion shaft connected to said carrier, a sun gear meshing with said planetary pinions, an inner clutch drum and a torque reaction control gear connected to said sun gear, an outer clutch drum, a steer drive shaft connected to said outer clutch drum, clutch means connecting said inner clutch drum and said outer clutch drum in the engaged position and disconnecting said drums in the disengaged position, a power driven steering shaft, said outer clutch drum being driven by said power driven steering shaft, a housing having a cylinder and a valve bore, a piston slidably mounted in said cylinder, means connecting said piston to said clutch means to actuate said clutch means, reaction spring means to return said piston, a valve mounted for axial movement with said movable piston and in said valve bore, and said valve opening a small passage to conduct a small quantity of cooling oil to said clutch when the clutch is disengaged and said valve opening a large passage to supply a large quantity of cooling oil to said clutch when the clutch is engaged.

6. In a steering drive assembly, a drive shaft, a ring gear driven by said drive shaft, a plurality of planetary pinions meshing with said ring gear, a carrier, said planetary pinions being mounted on the carrier, a propulsion shaft connected to said carrier, a sun gear meshing with said planetary pinions, an inner clutch drum and a torque reaction control gear connected to said sun gear, an outer clutch drum, a steer drive shaft connected to said outer clutch drum, a plurality of clutch plates with alternate plates secured to the inner clutch drum and intermediate plates secured to the said outer clutch drum, a clutch abutment at one end of said clutch plates axially fixed to one of said drums, a clutch pressure plate at the other end of said clutch plates mounted for axial movement on one of said drums, a power driven steering shaft, said outer clutch drum being driven by said power driven steering shaft, a housing having a cylinder and a valve bore formed therein, a piston slidably mounted in said cylinder, means connecting said piston to said clutch pressure plate, reaction spring means to return said piston, a valve mounted on said movable piston and in said valve bore, and said valve opening a small passage to conduct a small quantity of cooling oil to said clutch when the clutch is disengaged and said valve opening a large passage to supply a large quantity of cooling oil to said clutch when the clutch is engaged.

7. In a transmission assembly, a driven cross shaft, a pair of differential gear sets each including a first, second and third element, said cross shaft being drivingly connected adjacent each end to one of said first elements, a propulsion member adjacent each end of said cross shaft connected to one of said second elements, a torque reaction drive interconnecting said third element of each differential gear set for rotation in opposite directions, a steer drive, a pair of steer clutches said steer drive and said third element of each of said differential gear sets being connected by one of said steer clutches, means to operate alternatively either of said steer clutches to cause in conjunction with said positive torque reaction drive one of said third elements to rotate in one direction and the other of said third elements to rotate in the other direction to cause one propulsion member to rotate faster and the other propulsion member to rotate slower, and an additional flywheel driven by said torque reaction drive.

8. In a tranmission assembly, an input shaft, a cross drive shaft driven by said input shaft, a pair of differential gear sets each including a first, second and third element, said cross drive shaft being drivingly connected adjacent each end to one of said first elements, a propulsion shaft adjacent each end of said cross shaft connected to one of said second elements, a torque reaction drive interconnecting said third element of each differential gear set for rotation in opposite directions, a steer shaft, said input shaft being connected to drive said steer shaft, a pair of steer clutches, said steer shaft and said third element of each of said differential gear sets being connected by one of said steer clutches, means to operate alternatively either of said steer clutches to cause in conjunction with said positive torque reaction drive one of said third elements to rotate in one direction and the other of said third elements to rotate in the other direction to cause one propulsion shaft to rotate faster and the other propulsion shaft to rotate slower, and an additional flywheel driven by said torque reaction drive.

9. In a transmission assembly, an input shaft, a cross drive shaft driven by said input shaft, a pair of differential gear sets each including a first, second and third element, said cross drive shaft being drivingly connected at adjacent each end to one of said first elements, a propulsion shaft adjacent each end of said cross shaft connected to one of said second elements, a torque reaction drive interconnecting said third element of each differential gear set for rotation in opposite directions, a steer shaft, said input shaft being connected to drive said steer shaft, a pair of steer clutches, said steer shaft and said third element of each of said differential gear sets being connected by one of said steer clutches, means to operate alternatively either of said steer clutches to cause in conjunction with said positive torque reaction drive one of said third elements to rotate in one direction and the other of said third elements to rotate in the other direction to cause one propulsion shaft to rotate faster and the other propulsion shaft to rotate slower, and an adidtional flywheel mass mounted for rotation and gear means directly and rigidly connecting said third element to continuously drive said flywheel at a speed proportional to the speed of said third element.

10. In a transmission assembly, an input shaft, a cross drive shaft driven by said input shaft, a pair of planetary gear sets including a ring gear, a sun gear, and a set of planetary pinions on a carrier meshing with said ring and sun gears, said cross drive shaft being drivingly connected adjacent each end to one of said ring gears, a propulsion shaft adjacent each end of said cross shaft connected to one of said carriers, torque reaction sun gear meshing with each set of pinions, a positive torque reaction drive consisting of gearing and a cross torque reaction shaft interconnecting said sun gears of each planetary gear set for rotation in opposite directions, a steer shaft, said input shaft being connected to drive said steer shaft, a pair of steer clutches, said steer shaft and said sun gear of each of said planetary gear sets being connected by one of said steer clutches, means to operate alternatively either of said steer clutches to cause in conjunction with said positive torque reaction drive one reaction sun gear to rotate in one direction and the other sun gear to rotate in the other direction to cause one propulsion shaft to rotate faster and one propulsion shaft to rotate slower, and a flywheel mounted to rotate about the axis of said steer shaft and gear means interconnecting said flywheel to rotate at all times at a speed proportional to the speed of at least one of said torque reaction sun gears.

11. In a transmission assembly, an input shaft, a transmission unit driven by said input shaft including a torque converter having a first output shaft and a multiratio gear unit driven by said first output shaft and driving a second output shaft, a pair of differential gear sets each including a first, second and third element, said second output shaft being drivingly connected to each of said first elements, a propulsion member connected to each of said second elements, means connecting said third elements for rotation in opposite directions, a steer drive connected to said first output shaft, a pair of steer clutches, said steer drive and said third element of each of said differential gear sets being connected by one of said steer clutches, a flywheel mass connected to one of said third elements, and means to operate alternatively either of said steer clutches to cause in conjunction with said positive torque reaction drive one of said third elements to rotate in one direction and the other of said third elements to rotate in the other direction to cause one propulsion member to rotate faster and the other propulsion member to rotate slower.

12. In a transmission assembly, an input shaft, a transmission unit driven by said input shaft including a torque converter having a first output shaft and a multiratio gear unit driven by said first output shaft and driving a second output shaft, a cross shaft driven by said second output shaft, a pair of differential gear sets each including a first, second and third element, said cross shaft being drivingly connected at each end to one of said first elements, a propulsion member connected to one of said second elements, a torque reaction drive interconnecting said third element of each differential gear set for relative rotation only in opposite directions, a steer drive connected to said first output shaft, a pair of steer clutches, said steer drive and said third element of each of said differential gear sets being connected by one of said steer clutches, flywheel means connected to said third elements, and means to operate alternatively either of said steer clutches to cause in conjunction with said positive torque reaction drive one of said third elements to rotate in one direction and the other of said third elements to rotate in the other direction to cause one propulsion member to rotate faster and the other propulsion member to rotate slower.

13. In a steering drive assembly, a drive shaft, a ring gear driven by said drive shaft, a plurality of planetary pinions meshing with said ring gear, a carrier, said planetary pinions being mounted on the carrier, a propulsion shaft connected to said carrier, a sun gear meshing with said planetary pinions, an inner clutch drum connected to said sun gear, a first drive gear located adjacent said ring gear and connected to said sun gear, an outer clutch drum, a plurality of clutch plates wtih alternate plates secured to the inner clutch drum and intermediate plates secured to the said outer clutch drum, a clutch abutment surface formed on said first drive gear, a clutch pressure plate at the other end of said clutch plates mounted for axial movement on said outer drum, said outer clutch drum having a second drive gear located adjacent said first drive gear, a housing having a cylinder and a valve bore, a piston slidably and non-rotatably mounted in said cylinder, means including a transfer bearing connecting said piston to said clutch pressure plate to permit relative rotation of said piston and clutch pressure plate, reaction spring means to return said piston, a valve mounted on said movable piston and slidable in said valve bore, and said valve opening a small passage to conduct a small quantity of cooling oil to said clutch when the clutch is disengaged and said valve opening a large passage to supply a large quantity of cooling oil to said clutch when the clutch is engaged.

14. In a steering drive assembly, a drive shaft, a ring gear driven by said drive shaft, a plurality of planetary pinions meshing with said ring gear, a carrier, said planetary pinions being mounted on the carrier, a propulsion shaft connected to said carrier, a sun gear meshing with said planetary pinions, an inner clutch drum connected to said sun gear, a first drive gear located adjacent said ring gear and connected to said sun gear, an outer clutch drum, a plurality of clutch plates with alternate plates secured to the inner clutch drum and intermediate plates secured to the said outer clutch drum, a clutch abutment surface formed on said first drive gear, a clutch pressure plate at the other end of said clutch plates mounted for axial movement on said outer drum, said outer clutch drum having a second drive gear located adjacent said first drive gear, a housing having a cylinder, a piston slidably and non-rotatably mounted in said cylinder, means including a transfer bearing connecting said piston to said clutch pressure plate to permit relative rotation of said piston and clutch pressure plate, and reaction spring means to return said piston.

15. In a steering drive assembly, a housing having a support sleeve, a drive shaft, a ring gear driven by said drive shaft, a plurality of planetary pinions meshing with said ring gear, a carrier, said planetary pinions being mounted on said carrier, a propulsion shaft connected to said carrier, a sun gear meshing with said planetary pinions, an inner clutch drum located externally of said support sleeve and connected to said sun gear, a first drive gear located adjacent said ring gear and connected to said sun gear, first bearing means axially and rotatably supporting said inner clutch drum, first drive gear and sun gear on said support sleeve, an outer clutch drum having a hub with an aperture, second bearing means axially and rotatably supporting said hub and outer clutch drum on said support sleeve, a plurality of clutch plates with alternate plates secured to the inner clutch drum and intermediate plates secured to the said outer clutch drum, a clutch abutment surface at one end of said clutch plates formed on said first drive gear, a clutch pressure plate at the other end of said clutch plates mounted for axial movement between said inner and outer drums, said outer clutch drum having a second drive gear located adjacent said first drive gear, said housing having a cylinder, a piston slidably and nonrotatably mounted in said cylinder, means including a transfer bearing connected to said piston, extending through said aperture in said hub, and connected to said clutch pressure plate to permit relative rotation of said piston and clutch pressure plate, and reaction spring means located between said second bearing means and said transfer bearing to return said piston.

(References on following page)

References Cited in the file of this patent

UNITED STATES PATENTS

| | | |
|---|---|---|
| 2,272,934 | Cotal | Feb. 10, 1942 |
| 2,377,354 | Merritt | June 5, 1945 |
| 2,472,452 | Wissman | June 7, 1949 |
| 2,496,429 | Banker et al. | Feb. 7, 1950 |
| 2,525,190 | Toot et al. | Oct. 10, 1950 |
| 2,632,544 | Hockert | Mar. 24, 1953 |
| 2,658,596 | Archambault | Nov. 10, 1953 |
| 2,659,468 | Hobbs | Nov. 17, 1953 |
| 2,689,488 | Storer et al. | Sept. 21, 1954 |
| 2,689,489 | Storer et al. | Sept. 21, 1954 |
| 2,692,514 | O'Leary | Oct. 26, 1954 |

FOREIGN PATENTS

| | | |
|---|---|---|
| 1,000,828 | France | Oct. 17, 1951 |